P. WERTZ.
AIR BRAKE SYSTEM.
APPLICATION FILED JUNE 28, 1913.

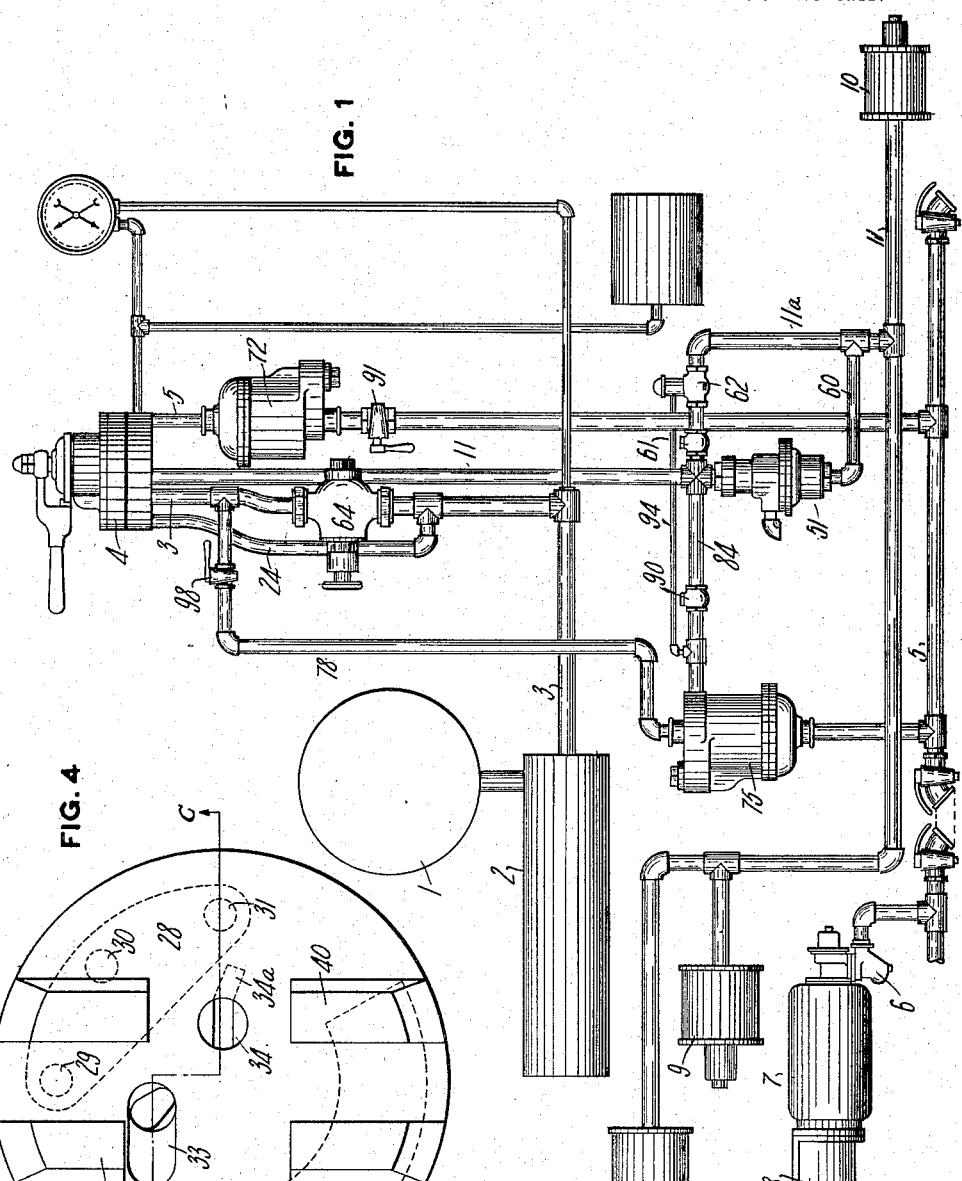
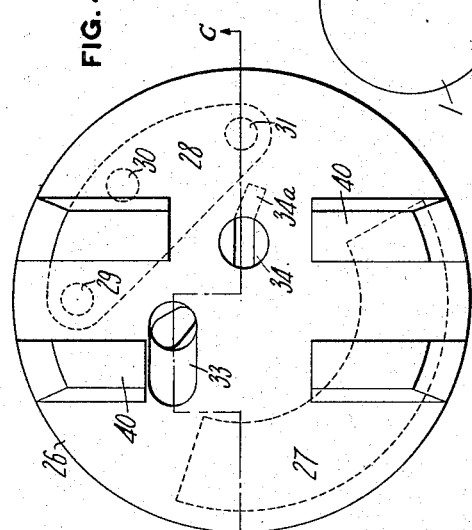

1,192,482.

Patented July 25, 1916.
5 SHEETS—SHEET 2.

WITNESSES

INVENTOR
Peter Wertz

P. WERTZ.
AIR BRAKE SYSTEM.
APPLICATION FILED JUNE 28, 1913.
1,192,482.
Patented July 25, 1916.
5 SHEETS—SHEET 3.
FIG. 6
FIG. 7
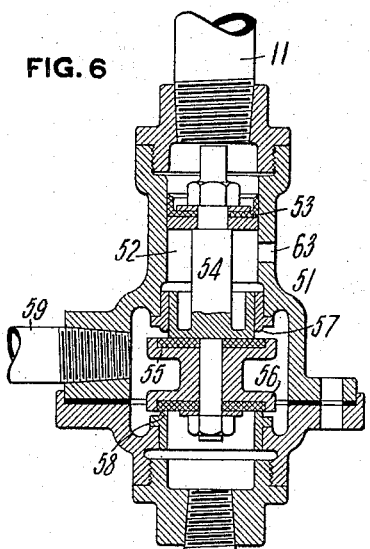
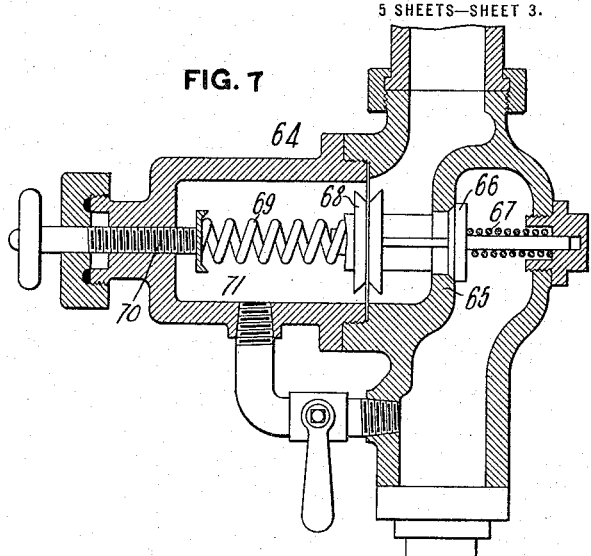
FIG. 5
FIG. 8
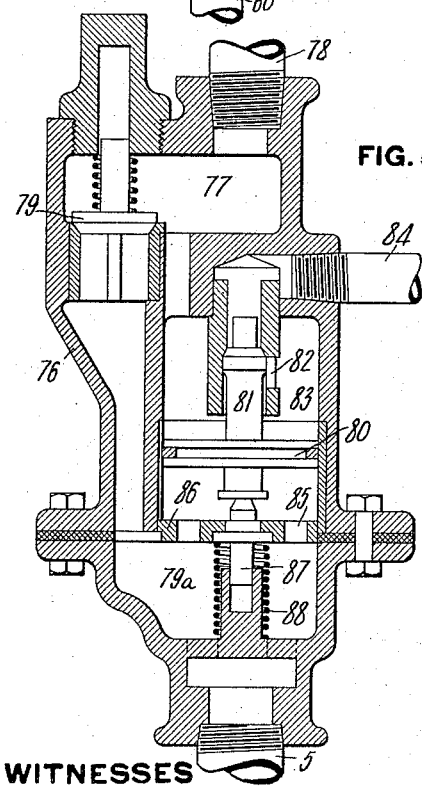
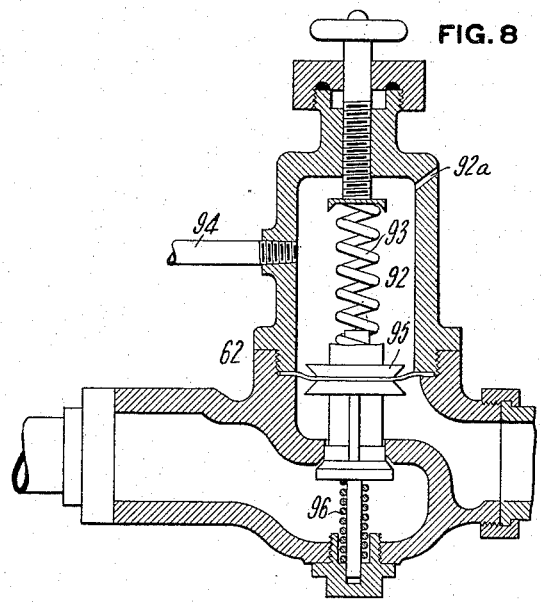
WITNESSES
INVENTOR
Peter Wertz
By Fredk H. Winter
his attorney

P. WERTZ.
AIR BRAKE SYSTEM.
APPLICATION FILED JUNE 28, 1913.

1,192,482.

Patented July 25, 1916.
5 SHEETS—SHEET 4.

WITNESSES

INVENTOR
Peter Wertz
By Fredk F. Winter
his attorney

P. WERTZ.
AIR BRAKE SYSTEM.
APPLICATION FILED JUNE 28, 1913.

1,192,482.

Patented July 25, 1916.
5 SHEETS—SHEET 5.

WITNESSES
W. T. Holman
Elbert L. Hyde

INVENTOR
Peter Wertz
By Fredk H. Winter
his attorney

UNITED STATES PATENT OFFICE.

PETER WERTZ, OF PITTSBURGH, PENNSYLVANIA.

AIR-BRAKE SYSTEM.

1,192,482.　　　　Specification of Letters Patent.　　Patented July 25, 1916.

Application filed June 28, 1913. Serial No. 776,250.

*To all whom it may concern:*

Be it known that I, PETER WERTZ, a resident of Pittsburgh, in the county of Allegheny and State of Pennsylvania, have invented a new and useful Improvement in Air-Brake Systems, of which the following is a specification.

This invention relates to air brake systems, and its object, briefly, is to provide an air brake system in which the engineer has better control of the train and can secure better brake service than with existing air brake systems, and by the use of less and simpler apparatus.

Generally stated, the invention comprises a system wherein the engineer, with a single brake valve, can apply and release the brakes on the engine and train either independently or in unison with one brake valve, as required; wherein the engine brakes are automatically applied in case a hose bursts or an emergency application is made; and also comprises a special arrangement and valve enabling the engine equipment to be used in double heading or in case the engine is dead heading or without steam in the boiler, without the use of a special engine triple, distributing valve or auxiliary reservoir.

Figure 2:
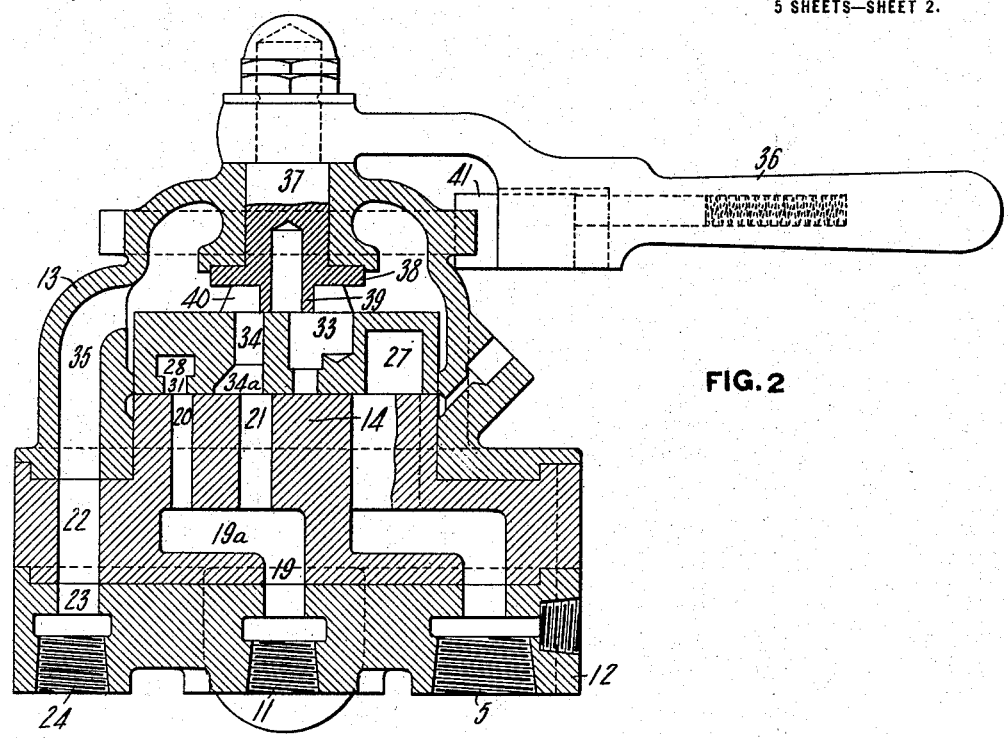
Figure 3:
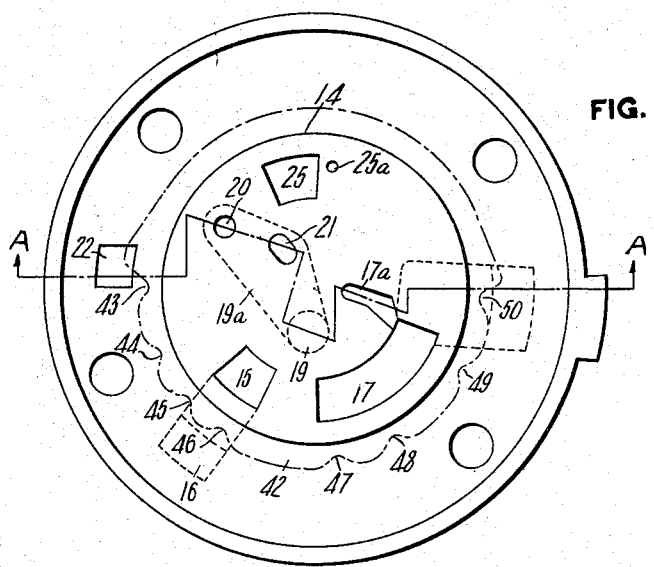
Figure 9:
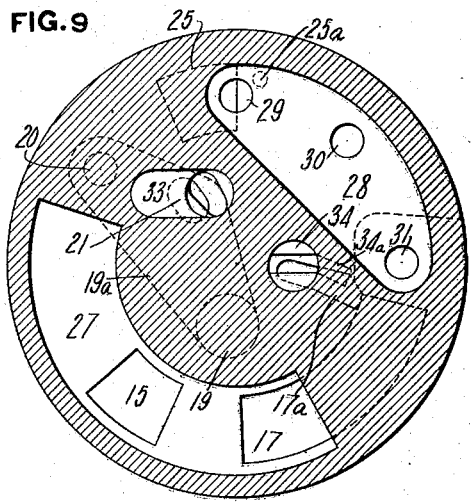
Figure 10:
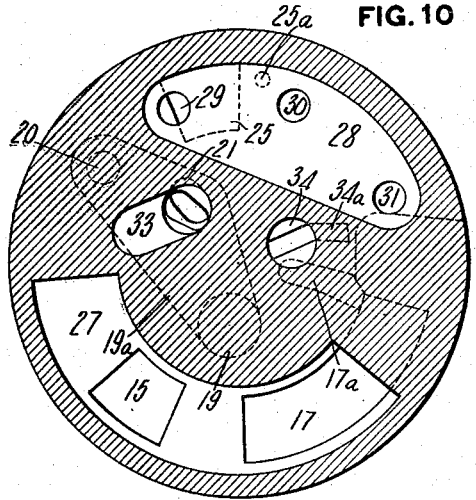
Figure 11:
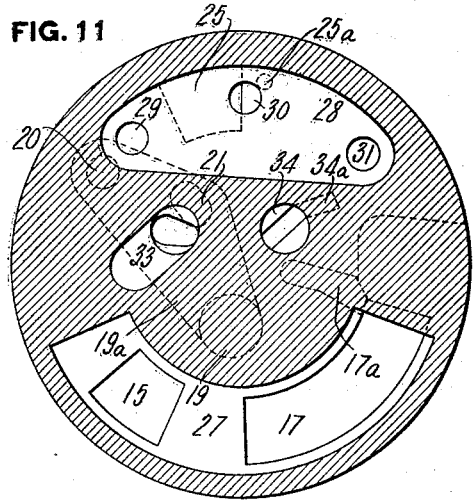
Figure 12:
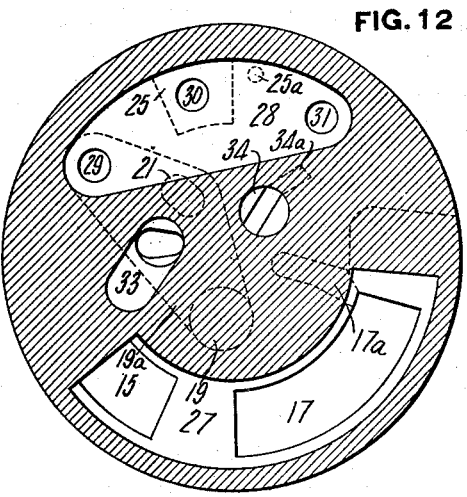
Figure 8A:
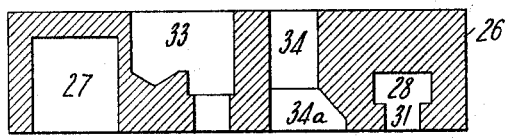
Figure 13:
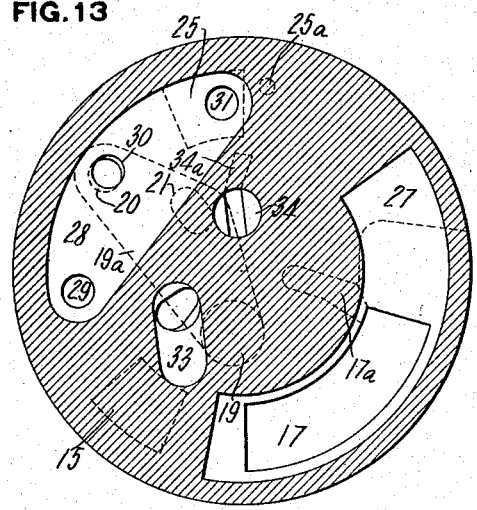
Figure 14:
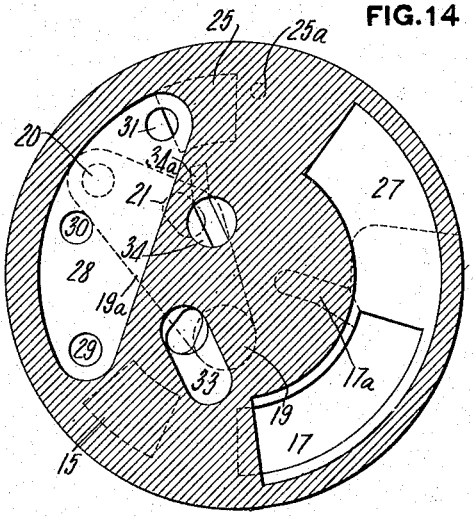
Figure 15:
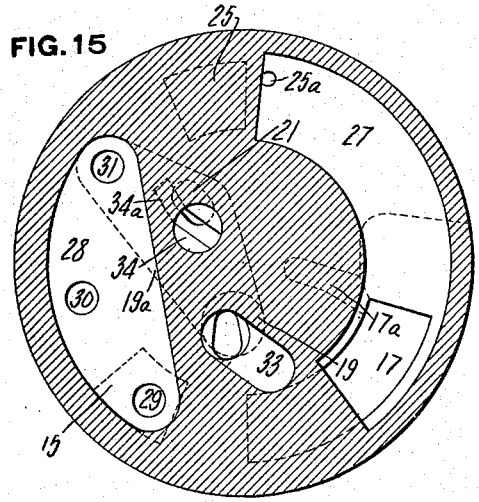
Figure 16:
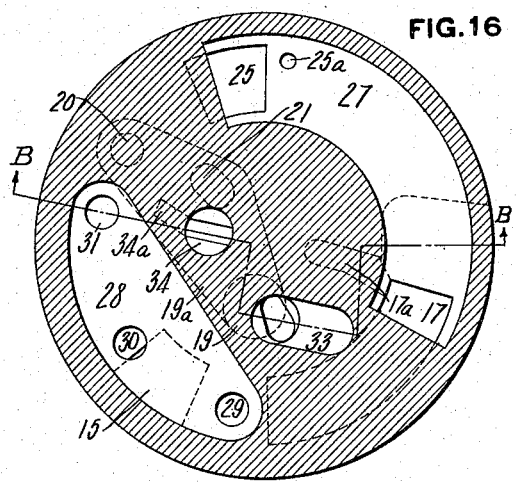

In the accompanying drawings, Figure 1 is a diagrammatic view of the improved system; Fig. 2 is a sectional view through the engineer's brake valve, showing the same in emergency position, the valve seat being shown in section taken on the line A—A, Fig. 3, and the rotary valve in section on the line B—B, Fig. 16; Fig. 3 is a detail plan view of the same, the top casing member being omitted, and showing the valve seat in full lines and the quadrant in dash lines; Fig. 4 is a plan view of the rotary valve; Fig. 5 is a vertical section through the special double heading valve; Fig. 6 is a similar view through the brake cylinder exhaust valve; Fig. 7 is a section through a pressure controlling valve; Fig. 8 is a section through a reducing valve; Fig. 8$^a$ is a detail section through the rotary valve on the line C—C, Fig. 4; and Figs. 9 to 16 are diagrammatic views showing the different positions of the engineer's brake valve.

My system is particularly designed as an improvement upon the system shown, described and claimed in the prior application of F. H. Dukesmith, for air brake system, filed November 25, 1912, Serial No. 733,430, and in some respects is similar thereto. As illustrated in the drawings, it embodies the usual air pump 1, main reservoir 2, pipe 3 leading from the main reservoir to the engineer's brake valve 4, and train pipe 5 connected to the engineer's brake valve and extending throughout the train, and having connected thereto upon each car the usual automatic brake mechanism comprising a triple valve 6, auxiliary reservoir 7 and brake cylinder 8, all connected up and operating in the usual way of automatic air brake systems, such as the Westinghouse or New York Air Brake Company's systems. The only difference from these systems so far referred to is in the construction and function of the engineer's brake valve 4, as will be hereinafter pointed out. 9 represents the engine brake cylinders and 10 the tender brake cylinder, which are all connected by the pipe 11 to the engineer's brake valve 4, for operation by straight air or direct pressure when desired, as hereinafter described. The engineer's brake valve 4 has a casing comprising a lower portion 12 and an upper portion 13, suitably secured together as is usual. The flat upper face of the lower portion 12 has rigidly secured thereto a valve seat 14, which preferably is a flat horizontal seat and is provided with the necessary ports and openings for effecting the various functions of the valve. As shown, said seat is provided with a port 15, communicating with a passage 16 to which the main reservoir pipe 3 is connected; a large arc-shaped port 17 having an end extension 17$^a$ and communicating with a passage to which the train pipe 5 is connected; a port 19 communicating with the engine brake cylinder pipe 11, a small port 20 and a larger port 21 cored through the casing and communicating with a cored passage 19$^a$ leading to the port 19; a large exhaust port 25 leading to the atmosphere; and a small exhaust port 25$^a$ also leading to the atmosphere. The lower portion of the casing is provided with a port 22 communicating with a passage 23 leading to a pipe 24 connected to the main reservoir pipe 11, as hereinafter described. Coöperating with the valve seat 14 is the rotary disk valve 26, which is provided on its lower face with the arc-shaped cavity 27, of considerable length, and in its body with a cored out arc-shaped passage 28, which opens on the face of the disk next to the valve seat through three large ports 29, 30 and 31. Extending entirely through the disk are an oval port 33 having a large opening on the upper face of the valve, and a large port 34 having an angular extension 34ᵃ on the valve seat face of the disk.

The upper part of the valve casing is provided with a passage 35 leading from the port 22 to a chamber above the rotary disk valve, so that the pressure above the rotary valve is always main reservoir pressure unreduced. Said disk is rotated by a handle 36 connected to the stem 37 of a rotary member 38 mounted in the casing and having a suitable connection with the disk, such as a key 39 fitting between ribs 40 on the upper surface of the disk. The handle is provided with the usual spring-pressed dog 41, co-operating with notches in the quadrant 42, all as is usual in engineers' brake valves. The quadrant is provided with shoulders or notches 43, 44, 45, 46, 47, 48, 49 and 50 adapted to receive the spring-pressed dog 41 and indicating the various position for effecting the several operations and functions of the brake valve.

The engine and tender brake cylinders are exhausted through a special valve shown at 51. This comprises a suitable casing having therein a chamber 52, in which works a piston or diaphragm 53, having a stem 54 carrying two valves 55, 56 adapted to co-operate with oppositely disposed valve seats 57 and 58. The chamber 52, on the upper side of the piston 53, communicates with the pipe 11 leading from the brake cylinders to the engineer's brake valve. Between the valve seats 57 and 58, the chamber is provided with a side exhaust port or outlet 59. Valve 55 seats toward the pipe 11 leading to the engineer's brake valve, and valve 56 seats in the opposite direction or away from said pipe 11. Chamber or space 52 within the casing, at the opposite end of the valve from pipe 11, communicates through a pipe or connection 60 with the pipe 11 leading to the engine brake cylinder. A side branch 11ᵃ of pipe 11 passes around the exhaust valve and is provided with a non-return check valve 61 arranged to seat toward the engineer's brake valve, so as to permit pressure to flow from the engineer's brake valve past said check valve and through the branch 11ᵃ into the brake cylinders, but not in the reverse direction. Between this check valve and the brake cylinder is located a reducing valve 62, hereinafter referred to more fully in detail. Chamber 52 of the exhaust valve, between the piston 53 and valve 55, is open to the atmosphere through a vent port 63. The valve seats 57, 58 are formed with comparatively sharp edges and are of smaller diameter than the piston 53, so that the latter is in effect a differential piston, with a greater effective area on the upper or engineer's brake valve side than on the lower or brake cylinder side.

The purpose of the exhaust valve 51 is to control the exhaust from the engine and tender brake cylinders. It is apparent that as long as pressure exists in the chamber 52 above the piston 53, the piston will be forced downwardly, seating valve 56 against its valve seat 58 and closing the exhaust outlet from the brake cylinder. The valve will remain closed as long as the brakes are applied, due to the full pressure on the upper side of piston 53 and the reduced brake cylinder pressure acting through the connection 60 on the valve 56. When, however, pressure is reduced in the chamber 52 on the upper side of the piston 53, by manipulation of the engineer's brake valve to connect pipe 11 to exhaust, piston 53 rises under the influence of the pressure thereunder, coming from the brake cylinders by way of the connection 60, the non-return check valve 61 preventing flow of pressure through the side branch 11ᵃ. Valve 56 therefore opens and establishes communication between the brake cylinders and the exhaust outlet 59, and closes valve 55, so that no air from the brake cylinders exhausts through pipe 11 and the engineer's brake valve. The brake cylinders are charged with air through the pipe 11 leading from the engineer's brake valve and upon application of the brakes, the pressure in pipe 11 forces down piston 53, thereby overcoming the lower effective pressure beneath the valve 56 and closing said valve and the exhaust outlet from the brake cylinders.

In the main reservoir pipe 3 is provided a suitable pressure controlling valve 64, shown in Fig. 7. The passage through this valve is divided by a partition 65 provided with an opening which is controlled by a valve 66 which seats toward the engineer's brake valve, being normally held to its seat by spring 67. On the engineer's brake valve side of the pressure controller is a suitable piston or diaphragm 68, which is either connected to or bears against the stem of valve 66. Regulating spring 69 bears against this piston or diaphragm and tends to move the same in a direction to unseat the valve 66. The spring 69 is adjusted or regulated by a screw 70, located in a side chamber 71.

If the main reservoir pressure is at, say 100 pounds, and the regulating spring 69 is set at, say 70 pounds, this spring holds the check valve 66 open until there is slightly more than 70 pounds pressure on the engineer's brake valve side of the pressure controller, when the spring 69 is overbalanced and the diaphragm 68 is forced away from valve 66 so as to permit said valve to be seated by its spring 67 and the main reservoir pressure. As soon as the pressure in the train pipe falls below 70 pounds the spring 69 pushes the diaphragm outwardly and again opens the check valve 66 and holds it open until the brake pipe pressure builds up slightly above 70 pounds.

In the operation of air brake systems on long trains where the train pipe has considerable volume the front brakes of the train are frequently let off, or fail to set, in service application, due to the restricted vent opening at the engineer's brake valve and the forward surging of the large volume of air in the train pipe, the latter causing a momentary increase of pressure at the forward end of the train pipe and either releasing the brakes as described or preventing them from being applied. In order to overcome this difficulty, I utilize an equalizing accelerator valve 72, which is of the same type and description as the valve shown for this purpose in the prior Dukesmith application hereinabove referred to. This valve is connected in the train pipe 5, as shown in the drawings.

75 represents a special valve for use in double heading or dead heading, and acting to automatically apply the brakes in emergency or in case a hose bursts. This valve in most of its features, is identical with the equalizing accelerator valve 72 just referred to, but is used in inverted position. The valves are, however, so nearly alike that the same patterns can be used in producing them, thereby decreasing the cost of installation.

The valve comprises a suitable casing 76 having therein a chamber 77 in communication, through a pipe 78, with the main reservoir pipe 3 between the pressure controlling valve 64 and the engineer's brake valve. Chamber 77 has communicating therewith a by-pass or passage which is controlled by a check valve 79 in position to close said passage, said passage communicating with a chamber 79ª in the lower part of the casing, which chamber is in direct communication with the train pipe 5. The chamber 77 in the upper part of the valve casing communicates with the upper side of a piston 80. This piston carries a graduating valve 81 having portions of different diameters, as shown, and controlling the port 82 which connects the chamber 83 above the piston 80 with a passage leading to a pipe 84 communicating with pipe 11 at the upper end of the brake cylinder exhaust valve 51. The under face of the piston 80 is in direct communication with chamber 79ª through ports 85 in the plate 86. An equalizing stem 87 held by spring 88 is located in contact with the stem of piston 80, said spring being under light tension when the valve is closed.

The operation of this valve is as follows: The main reservoir pressure in pipe 3 is reduced through the pressure controlling valve 64 to train pipe pressure, so that in running position the pressure in the chamber 83 above piston 80, which is in communication with pipe 3 above the pressure controlling valve 64, is the same as the train pipe pressure effective on the under side of piston 80. Whenever the train pipe pressure is reduced sufficiently for the spring 88 to yield, say seven pounds, piston 80 moves downwardly and opens the port 82, thereby admitting pressure from the main reservoir pipe 3 into pipe 11 and to the engine brake cylinders, so that if the engine is a second or following engine in double heading reduction of train pipe pressure by manipulation of the engineer's brake valve on the leading engine will automatically apply the engine and train brakes on the second or following engine.

Pipe 84 is provided with a non-return check valve 90, seating toward valve 75, to prevent back flow through said valve of brake cylinder pressure or pressure admitted to pipe 11. In double heading the cock 91 in the train pipe connection 5 on the second or following engine is closed, and on said engine the engineer's brake valve is placed in running position, but slightly turned in the clockwise direction from the position shown in Fig. 12, so that port 29 in the valve seat is almost lapped, having only a small opening to the cavity 28 and allowing a slight leakage to exhaust from the pipe 11 through the engineer's brake valve. On the second or following engine the main reservoir maintains the pressure of the engine brake cylinders by pressure admitted through pipe 84, and the main reservoir also maintains the slight leakage through the pipe 11, and said leakage is not rapid or large enough to decrease the pressure on the upper surface of the piston in valve 51 so as to unseat said valve and produce an exhaust from the brake cylinders. However, when train pipe pressure is increased by manipulation of the engineer's brake valve on the leading engine, the increased train pipe pressure becomes effective in valve 75 on the second or following engine, and closes said valve so as to cut off communication from the main reservoir through the valve 75 to the pipe 84. This stops the supply of pressure to maintain the slight leakage from the pipe 11, so that said leakage immediately becomes effective and so reduces the pressure on the upper face of the piston in the valve 51 as to permit said piston to rise and exhaust the brakes of the second or following engine through the exhaust valve 51 in the usual manner.

Reducing valve 62 may be of the same construction and arrangement as the pressure controller 64, and is so shown in the drawings. It differs, however, in that chamber 92, in which is located the controlling spring 93, is provided with a small vent port 92ª, and is in communication through a small pipe 94, with the pipe 84 between the non-return check valve 90 and valve 75. The spring 93 is adjusted with heavier tension than spring 96, so that the valve is normally open. In service application, or in light applications of the brakes, valve 62 acts as a reducing valve to reduce the pressure from, say 70 pounds in the train pipe, to 45 pounds in the brake cylinder. In service applications the engine brakes are applied by direct or straight air pressure coming from the main reservoir by way of pipe 11. The check valve 90 prevents back flow of this pressure through the pipe 84. In service applications a reduction is also made in train pipe pressure so that valve 75 opens and allows pressure to flow from the main reservoir into pipe 84. Pipe 94 is small as compared to pipe 84 and chamber 92 is open to exhaust through the restricted vent 92ª. Pressure can not therefore build up in chamber 92 with sufficient rapidity to be effective on piston 95, and when the brake cylinder pressure builds up to the proper amount, say 45 pounds, it overbalances the spring 93 and allows spring 95 to close the reducing valve. When a heavy reduction is made in the train pipe pressure, as in emergency applications, the engine brakes are applied automatically, without straight air. Pipe 11 is cut off by the engineer's brake valve and all of the air flows into the brake cylinders by way of valve 75. It flows in with such force and rapidity that air can flow through pipe 94 and build up pressure in chamber 92 so that pressure is equally effective on both sides of the piston 95, and valve 62 is held open by the spring 93. In emergency applications, therefore, full main reservoir pressure, except as reduced by valve 64 is admitted to the engine brake cylinders.

The engineer's brake valve has eight positions, as follows:

1. Train release position, shown in Fig. 9, and in which the brake handle 36 is at the extreme left hand position with the dog 41 in the notch 43 of the quadrant 42. In this position the arc-shaped cavity 27 in the rotary valve 26 overlaps the ports 15 and 17 in the valve seat, so that main reservoir pressure reduced through the pressure controller 64 passes directly to the train pipe, thus keeping the train pipe charged and the brakes on all the cars released. Full main reservoir pressure passes up through pipe 24 and passages 23 and 35 to the chamber above the rotary valve and down through port 34 and extensions 34ª and 17ª to the arc-shaped port 17, thereby giving an additional source of main reservoir pressure and producing a quick release of the triple valves on all of the cars. Oval port 33 partly overlaps port 21, and unreduced main reservoir pressure therefore flows through the pipe 11 to the engine brake cylinders and holds the engine and tender brakes applied. The pressure also passes into the chamber 52 above the piston 53, thereby forcing down said piston and seating valve 56 and preventing exhaust from the main reservoir or from the brake cylinders by way of the exhaust valve 51. This position enables the engineer to either make an independent straight air application of the engine and tender brakes while the train brakes are kept released, or it enables him to hold the engine and tender brakes applied while releasing the train brakes. This prevents pulling out the draw heads. It also enables the train brakes on a long train to be pumped off at a stop while holding the train with the engine brakes, so that the train can move as soon as the stop is over, without further delay. To release the engine brakes after this application has been made the engineer turns the handle 36 of his valve to running position, hereinafter described.

2. Straight air application position, shown in Fig. 10. In this position the spring dog 41 of the brake valve handle engages notch 44 in the quadrant 42. Cavity 27 overlaps ports 15 and 17 in the valve seat, so that train pipe pressure is maintained by the main reservoir. Extensions 34ª and 17ª have passed out of registration with each other. Port 33 is fully over port 21 in the valve seat, so that full main reservoir pressure is admitted from the chamber above the rotary valve to pipe 11 and the engine and tender brake cylinders. All other ports in the valve are lapped or closed. This position enables the engineer to make a full straight air application of the engine and tender brakes, so that the slack in the train can be taken up before applying the train brakes. After applying the engine brakes the train brakes may be applied by turning the handle of the valve to service position, hereinafter described. The engine brakes may be held applied after a straight air application by turning the valve to straight air or to maintenance lap position.

3. Straight air lap position, shown in Fig. 11. In this position the dog 41 of the brake valve handle engages notch 45 of the quadrant 42. The arc-shaped cavity 27 overlaps ports 15 and 17 in the valve seat, so that train pipe pressure is maintained by the main reservoir. All other ports in the valve are lapped or closed, so that the engine and tender brakes, when applied, may be held without application of the train brakes.

4. Running or full release position, shown in Fig. 12. In this position the dog 41 of the brake valve handle is in contact with notch 46 of the quadrant 42. The cavity 27 of the rotary valve overlaps ports 15 and 17 in the valve seat, so that train pipe pressure is maintained by the main reservoir and the brakes on all the cars are released. Ports 29 and 30, which communicate with cavity 28 in the rotary valve, respectively overlie the ports 20 and 25 in the valve seat. Pipe 11, which is in communication with port 19 is therefore open to exhaust. This exhausts pressure from chamber 52 above the piston 53, and since the brake cylinder pressure cannot flow backwardly through branch 11ᵃ, on account of check valve 61, it is compelled to pass by pipe 60 into chamber 52 underneath piston 53 and valve 56 and lift the piston and unseat valve 56 and also closing valve 55. The brake cylinder pressure consequently is prevented from returning to the pipe 11 and escapes at the exhaust port 59, thereby releasing the engine and tender brakes. This release can be gradual, as the brake valve handle can be manipulated to exhaust mere puffs of air from pipe 11 through the small port 20 and reduce the brake cylinder pressure pound by pound, as desired.

5. Independent release position, shown in Fig. 13. In this position the spring dog 41 of the brake valve handle engages the notch 47 in quadrant 42. Port 30 in the valve overlaps port 20, and port 31 overlaps the exhaust port 25. All other ports are blanked. In this position the pressure in pipe 11 and chamber 53 escapes to the atmosphere by way of ports 19, 20, 30 and 31, consequently opening the engine and tender brake cylinders to exhaust through the exhaust valve. This is the position assumed when it is desired to release the engine brakes independently of the train brakes after application of the latter, either in service or in emergency position.

6. Maintenance lap position, shown in Fig. 14. In this position of the valve the spring dog 41 of the brake valve handle engages the notch 48 of the quadrant 42. In this position port 34 in the rotary valve partly overlaps port 21 in the valve seat, thereby gradually supplying main reservoir pressure to pipe 11 and the engine and tender brake cylinders. This allows the brakes to go on very gradually and also takes care of leakage in the brake cylinders on the engine and tender.

7. Service application, shown in Fig. 15. In this position of the valve the spring dog 41 of the brake valve handle engages notch 49 of quadrant 42. In this position of the valve one end of the cavity 27 in the rotary valve 26 overlaps the small service application exhaust port 25ᵃ in the valve seat and the other end of said cavity overlaps port 17 in the seat, so that in this position the train pipe is vented to the atmosphere, but at a moderate rate. The moderate reduction of pressure in the train pipe thereby produced causes all of the triple valves throughout the train to respond and set the brakes on the cars. Port 29 also registers with main reservoir port 15, while port 31 registers with the small port 20 in the valve seat. Port 34 also partly overlaps port 21. Main reservoir pressure, therefore flows from two sources to the pipe 11 and to the engine and tender brake cylinders. The reduction of train pipe pressure also causes the piston 80 of the double heading valve 76 to move downwardly and open valve 81, thereby establishing communication from the main reservoir pipe 3, pipe 78, valve 75 and pipe 84 to the engine brake cylinders. Valve 62 acts as a reducing valve, and when the pressure in the engine and tender brake cylinders builds up to, say 45 pounds, said valve closes. Pressure is also admitted to the chamber 52 above piston 53 of valve 51, thereby seating valve 56, whereby the engine and tender brake cylinders are held set in exact proportion to the amount of reduction from the train pipe.

8. Emergency position, shown in Fig. 16. This position is reached when the spring dog 41 of the brake valve handle engages notch 50 in the quadrant 42. In this position cavity 27 in the rotary valve overlaps train pipe port 17 and the large exhaust port 25, thereby creating a large opening from the train pipe to the atmosphere, with a rapid and large reduction of train pipe pressure and emergency application of the train brakes. All other ports are blanked. The rapid and large reduction of train pipe pressure evacuates chamber 79 below the piston 80, so that said piston travels quickly downwardly with force sufficient to overcome the spring 88 and fully open the port 82. This admits a large volume of air from the main reservoir pipe 3 to pipe 84, whence it flows by way of valve 62 to the engine and tender brake cylinders. The same pressure is also effective through pipe 94 in the chamber 92 on the upper side of the piston 96. The pressures on both sides of said piston are equal and the valve 92 is consequently held open by the spring 93, so that full pressure is allowed to flow to the engine and tender brake cylinders. Pressure is also effective in the chamber 52 above piston 53, thereby closing valve 56 and holding the engine and tender brakes set. After making an emergency application the engineer, by bringing the handle back to maintenance lap position, can maintain the brake cylinder pressure on the engine and tender, regardless of brake cylinder leakage, or, if the brakes have been applied too severely, he may bring the handle back to independent release position and partly release the engine brakes to prevent heating or flattening the engine tires.

After an emergency application there is no pressure in the train pipe, and consequently valve 75 remains open since its spring 88 is unable to overcome the reduced main reservoir pressure still effective on the top of piston 80, so that main reservoir pressure would normally continue to flow to the engine brake cylinders. To release the brakes after an emergency application the engineer closes the cock 98 in the pipe 78 between valve 75 and pipe 3. This cuts out the main reservoir pressure from above valves 75 and 51. By placing the engineer's brake valve in independent release position the pressure is exhausted from pipe 11, which allows the piston of the valve 51 to move over and thereby exhaust the engine brake cylinders through valve 51. When the engine brake cylinders have been released cock 98 may be opened and the brake may then be operated in the usual manner.

In double heading the handle of the brake valve on both the leading and all following engines is carried in running position. Also, valve 91 on the second or following engines is closed. This prevents the second engine from pumping off the brakes set by the first engineer. In case the train pipe pressure is reduced, by moving the brake valve handle on the leading engine, the piston 80 in the valve 75 of the second or following engines moves and opens valve 81, thus establishing communication through the double heading valve 75 between the main reservoir and the pipe 11 leading to the brake cylinders. Pipe 11 on the second or following engines is open to exhaust through the ports 20, 29, 30 and 25. This will exhaust only the air in pipe 11, since the check valve 61 prevents exhaust from the brake cylinders. As the air is exhausted from pipe 11 it is rapidly replenished through the valve 75 since port 20 is restricted, but there is no serious waste of air from the main reservoir and the exhaust is not large enough to sufficiently reduce the pressure in chamber 52 above the piston 53 to open the valve 56. The brakes are consequently held applied. When train pipe pressure is increased by manipulation of the brake valve on the leading engine, piston 80 on the second engine moves over and cuts off communication between the main reservoir pipe 3 and pipe 84 leading to the brake cylinder pipe 11. Brake cylinder pipe 11 is, however, open to exhaust as before stated, and pressure is gradually exhausted from the chamber 52 above piston 53, thereby opening valve 56 and venting the brake cylinders of the second or following engines to the atmosphere through the exhaust port 59.

In case an engine is out of commission and is dead heading without steam in its boiler, so that its pump 1 is ineffective to maintain pressure in its reservoir 2, the main reservoir 2 becomes in effect an auxiliary reservoir. Cock 91 in the train pipe connection 5 is closed. Pressure leaks through the valve 75 past the check valve 79 and into the pipe 3, thence through the valve 64, which is held normally open, and into the main reservoir to maintain pressure therein. The pressure thereby created in the main reservoir is effective to apply the engine and tender brakes on a reduction of train pipe pressure, as in the case of double heading above described.

When an emergency application is made by the usual manipulation of the engineer's brake valve, or in case a hose bursts, the heavy and rapid reduction of pressure in the train pipe causes the piston 80 to move over and establish communication from the main reservoir through the double heading valve 76 and connection 84 to the pipe 11 and the brake cylinders. Valve 56 is closed, and after the pressure has equalized into the brake cylinders through the reducing valve 62, check valve 61 seats and prevents the return of pressure from the brake cylinders. The pressure in the main reservoir of the engine will hold the piston 80 downwardly and also keep the valve 56 closed, thereby preventing loss of air from the brake cylinders through the vent port 59.

After a service application the brakes are released by increasing train pipe pressure in the usual manner to move the piston 80, close valve 81 and open valve 56. Communication is then cut off between the main reservoir and brake cylinder pipe 11, but the exhaust from the brake cylinder pipe through the engineer's brake valve releases pressure from above the piston 53 and opens the brake cylinders to exhaust through valve 56 and exhaust port 59. The exhaust from the brake cylinder pipe and chamber 52, through the engineer's brake valve, produces a whistling noise, which in double heading, warns the engineer on the second or following engines, of any application of the brakes, either by manipulation of the engineer's brake valve on the leading engine, or automatically in case a hose bursts or the train parts.

In double heading, if the engineer of a second or following engine desires to apply his engine and tender brakes he may do so by turning his brake valve handle to the second or straight air application position. In this case pressure is admitted from the main reservoir to the engine brake cylinders by way of ports 33, 21, 19 and pipe 11. After the brakes have been applied they may be held applied by turning the brake valve handle to straight air lap position. The engineer may then release his brakes by turning his brake valve handle to running position. This exhausts the pressure from above the piston in valve 51 by way of port 20 and permits the brake cylinders to exhaust by way of the exhaust valve 51, as before described.

The system described does away with the necessity for a special triple valve and auxiliary reservoir upon the engine. It is so arranged that the engineer can apply the brakes either by straight air or automatically. Also, it may be utilized in double heading, without special adjustments of any cocks or valves, by merely placing the brake valve on the second or following engines in running position, to open the limited exhaust from the brake pipe to the atmosphere. Moreover, it embodies simple means for utilizing the main reservoir substantially as an ordinary auxiliary reservoir in case the engine is double heading, pressure being maintained in the main reservoir of the second and following engines, from the train pipe and the main reservoir on the leading engine, so that the brakes are rendered effective on all engines without the necessity of a special triple and auxiliary reservoir. The system also takes care of emergency applications, or in case a hose bursts, without the liability of loss of pressure from the brake cylinders or main reservoir. It also enables the engineer on the second or following engines to apply the brakes automatically in case of necessity and warns him of all applications of the brakes by other means.

The apparatus is extremely simple and comprises less apparatus than has been necessary in prior systems for effecting the same results. It may also embody a pressure controlling valve, an accelerating valve and a train pipe vent valve of the character shown in the prior patent to Dukesmith referred to, although this is not essential.

What I claim is:—

1. In an air brake system, the combination of a main reservoir, a brake cylinder, an engineer's brake valve, valve mechanism arranged upon variations in train pipe pressure to control communication between the main reservoir and brake cylinder, a valve between the main reservoir and brake cylinder, and a movable abutment coöperating with said valve and controlled by main reservoir pressure and arranged upon heavy reductions in train pipe pressure to hold said valve open.

2. In an air brake system, the combination of a main reservoir, a brake cylinder, an engineer's brake valve, valve mechanism arranged upon variations in train pipe pressure to control communication between the main reservoir and brake cylinder, a valve between the main reservoir and brake cylinder, and a movable abutment coöperating with said valve and controlled by main reservoir pressure and arranged upon service reduction in train pipe pressure to limit the brake cylinder pressure and upon heavy reduction in train pipe pressure to hold said valve open.

In testimony whereof, I have hereunto set my hand.

PETER WERTZ.

Witnesses:
ELBERT L. HYDE,
MILTON D. HAYS.

Copies of this patent may be obtained for five cents each, by addressing the "Commissioner of Patents, Washington, D. C."